Figure 6:
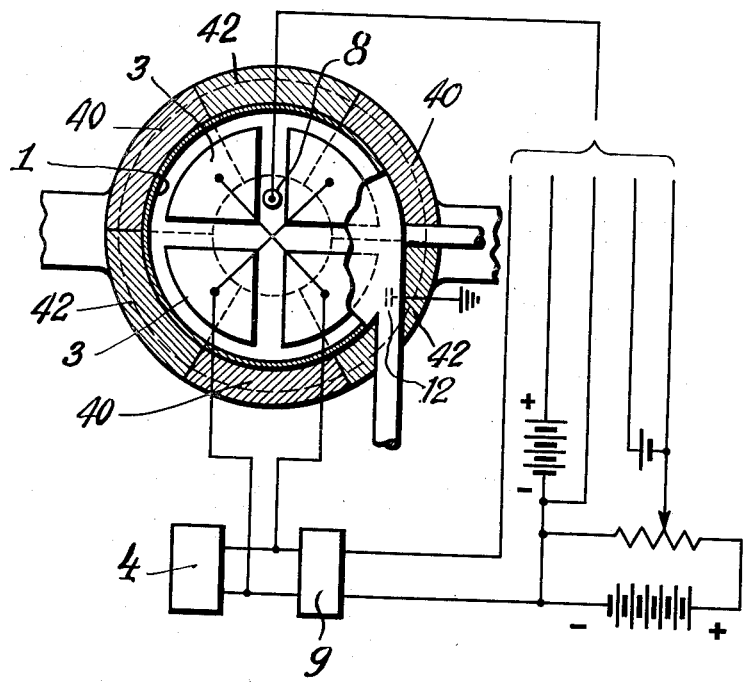

July 19, 1955
G. WEISSENBERG ET AL
2,713,635
ELECTRON-CYCLOTRON DISCHARGE APPARATUS
Filed Dec. 26, 1950
3 Sheets-Sheet 1
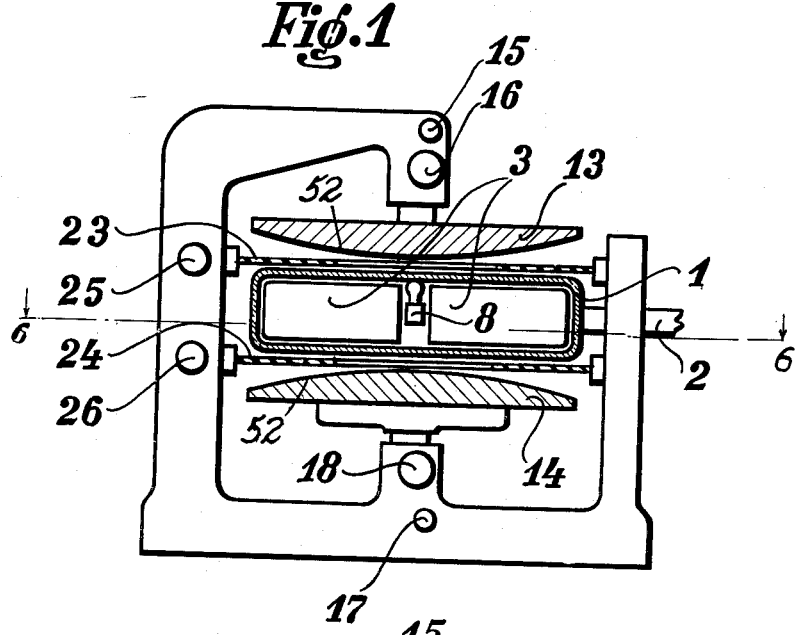
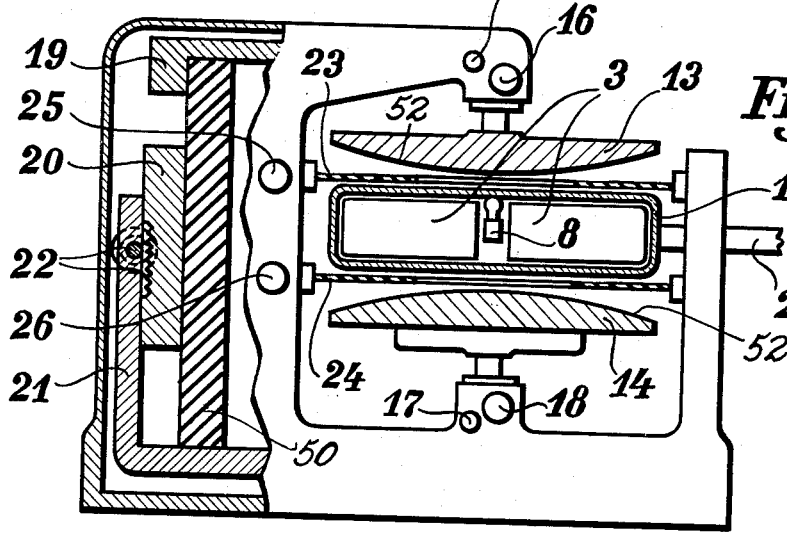
INVENTORS
GUSTAV WEISSENBERG,
REINHART SCHULZE,
AND FRIEDRICH SCHLÖGL.
BY
ATTORNEY

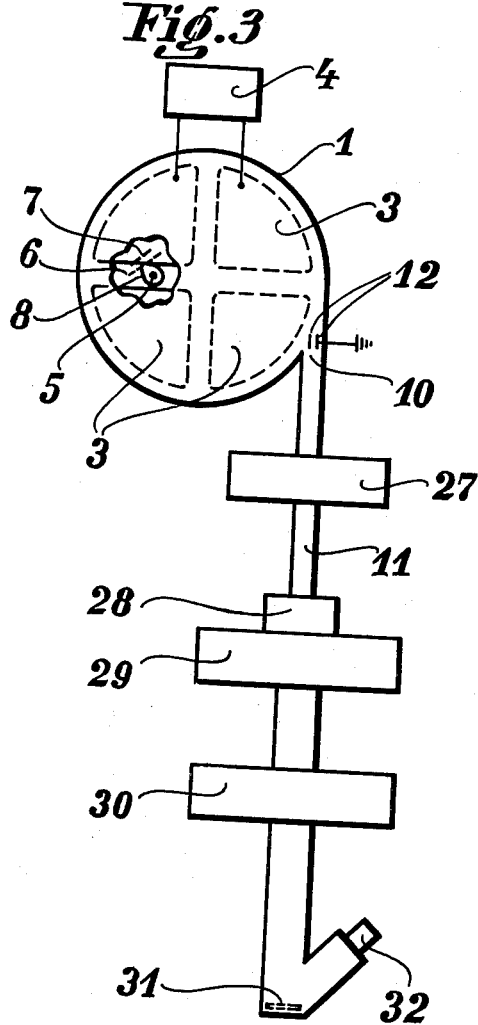
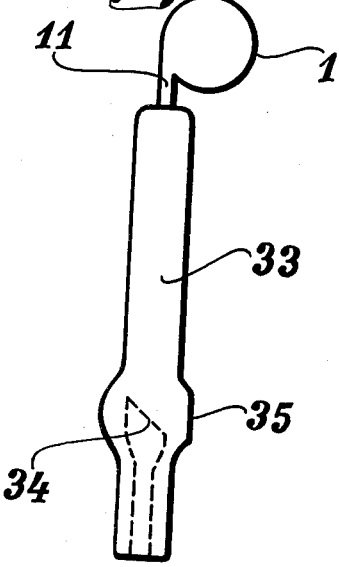
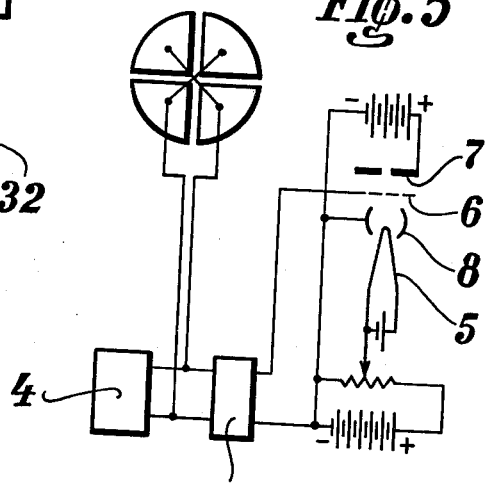

United States Patent Office 2,713,635
Patented July 19, 1955

2,713,635
ELECTRON-CYCLOTRON DISCHARGE APPARATUS

Gustav Weissenberg, Marburg (Lahn), Reinhart Schulze, Wetzlar (Lahn), and Friedrich Schlögl, Gottingen, Germany, assignors to Ernst Leitz, G. m. b. H., Wetzlar, Germany, a corporation of Germany Application December 26, 1950, Serial No. 202,774
In Germany December 19, 1949

Public Law 619, May 13, 1955
Patent expires December 19, 1969

5 Claims. (Cl. 250—27)

This invention relates to electron-cyclotron apparatus. The object of the invention is to provide a cyclotron adapted for use as an electron supply source for discharge devices which require high electronic speeds such as, for example, electronic microscopes, electronic bending apparatus, electronic spectroscopes, television and X-ray apparatus and the like.

Because such apparatus and devices demand high electron velocity whereby the relativistic increase of mass results when the velocity is increased, it has heretofore been the opinion that it would not be possible to maintain the electrons in their desired or intended orbits or paths of movements. For example, the increase of mass is very considerable even at some ten kilovolts. Prior thought on this subject has been that the cyclotron principle could not be utilized for electron supply sources and the use of a cyclotron as a useful powerful supply source has not heretofore been attempted so far as we know.

However, by taking into consideration later scientific knowledge, we have discovered that an electron-cyclotron is eminently well adapted for use as a source of electron supply for discharge apparatus of many different types. For example, it may be used in connection with the types of apparatus outlined above.

The great advantage of using the electron-cyclotron as an electron supply for such apparatus consists in that it is easily possible to insure, by means of a homogeneous velocity of the electronic ray obtained in the cyclotron, that the chromatic condition remain unchanged. Besides, with apparatus as hereinabove indicated, high tension elements which demand complicated and expensive insulation are avoided. Another practical advantage is that the electron apparatus may be embodied in a very small handy instrument because the required final energy of the electron reaches approximately 200 kilovolts when used with apparatus and instruments of the type indicated hereinbefore. The space required for the electron supply element or electron gun is only a fraction of that which is necessary for the usual high voltage supply source element.

Accordingly, our invention is embodied in an electron-cyclotron as hereinafter described and as illustrated in the accompanying drawings in which:

Fig. 1 is a view, partly in section and partly broken away, of an electron-cyclotron embodying the invention, Fig. 2 is a similar view with the addition of a shunting device for varying the magnetic field for keeping the electrons in their orbit or path of movement, Fig. 3 shows the combination of an electron-cyclotron and an electron-microscope, Fig. 4 shows an X-ray tube, Fig. 5 is a wiring diagram, Fig. 6 is a sectional plan view taken substantially on the line 6—6 of Fig. 1 with electric circuit elements added.

The different views are diagrammatic and schematic in character. Known details and elements are not illustrated nor described in the following specification.

Referring to Fig. 1, the numeral 1 indicates a glass or metal vessel from which the air may be exhausted through a connection 2 by any suitable mechanism. Within the vessel 1 are supported at least one, but preferably two pair of electrode dees 3 which, as shown in Figs. 3 and 5, are connected aperiodically to a high frequency source indicated at 4. The vessel 1 also contains the electron emission element which is preferably in the form of an incandescent cathode 5, a grid 6 Fig. 5, and one or more electrodes 7 and 8.

An especially advantageous form of emission element is obtained if the incandescent cathode 5 is partly enclosed by an electrode 8, Fig. 5, having a lower electric potential than the incandescent cathode. The grid 6 is connected with the high frequency oscillator generator 4 by means of an adjustable phase shifting element 9. The oscillator generator 4 generates the operating frequency for the "dees" of the cyclotron. A slotted anode 7 is included in the circuit in Fig. 5 to impart such speed to the electrons as is required for their entry into the dees 3 of the cyclotron.

The electron orbit is so arranged that the necessary direction and aperture of the bundle of electrons which enter the dees of the cyclotron are maintained. The aperture of the bundle of electrons refers to the angular circumference of the bundle which must be very narrow because all electrons which enter the field at an angle greater than about five degrees from the paths of the lines of force do not pass through the electron cyclotron in the correct tempo and are lost. The electron optic comprises the particular arrangement of the incandescent cathode 5 and the electrodes 6, 7 and 8 which produce an electron optic effect similar to the one used, for example, in cathode ray tubes. Technical means to accomplish this object are known and therefore not shown nor described.

The outlet for the electrons is preferably located in the place which divides the two electrodes dees. As shown in Fig. 3 the outlet opening 10 is located at the inner end of a tube 11 which connects the cyclotron with a discharge apparatus which in Fig. 3 is illustrated as being an electron microscope.

The electrons pass through the outlet 10 between the thin plates of a condenser 12, one side of which is grounded. The outlet 10 is so placed in the vessel 1 that it is by passed by the next to the last orbit of the electrons, whereas the last path of movement of the electron extends to the space between the condenser plates.

A particularly advantageous embodiment of the magnetic field which keeps the electrons in their orbit consists of two plates 13 and 14, Fig. 1, of permanent magnetic material having like magnetic poles. The plates are supported and located above and below the vessel 1, as shown. The two plates may be simultaneously moved toward and away from the median lateral plane of the apparatus by suitable known operating means. These latter may of course be so arranged that the symmetrical plane of the electron movement within the vessel 1 may be shifted. An even variation of the magnetic field—the strength of the field in the symmetrical plane—may be obtained by arranging the mechanism for moving the permanent magnets 13 and 14 in the form of known adjustment means indicated at 15, 16, 17 and 18. Or a magnetic shunt as shown in Fig. 2 at 19, 20 and 21 may be employed to be operated by suitable means as at 22. The magnetic shunt comprises the two arms 19 and 21 of ferromagnetic material and which are connected, respectively, to the two main magnets 13 and 14. The member 50 is nonmagnetic.

In order to compel the lines of force of the magnetic field to follow a predetermined path along the radius of the field, the permanent magnets 13 and 14 are provided with spherical surfaces 52 adjacent the vessel 1 as shown. The spherical surfaces are of advantage in that the manufacturing control and inspection are facilitated. The magnets may also be placed with their plane surfaces next to the vessel 1.

In order to compensate for the phase displacement of the electrons which is caused by the relativistic increase of the mass, the invention includes the use of an azimuthal periodic variation in the magnetic field. Such a field with respect to ions-cyclotrons has been calculated by Thomas, 54 Physical Review 580–588, 1938. The inventors' calculation for electrons showed that by using the Thomas' fields, the relativistic increase of the mass may be theoretically fully compensated for any desirable energy end level of the electrons if the periodical variations in the azimuthal magnetic field amounts to approximately the proportion of 1 to 0.6.

The said magnetic field may be obtained by different methods. Either, sectors of material having a high permeability may be symmetrically located between the permanent magnets to alternate with empty spaces, or sectors of sheet material having varying saturation permeability may be used.

The sectors 23, 24 may have different radial thicknesses or may be centrally operated like iris diaphragms. They are moved simultaneously by suitable mechanical coupling. One or both diaphragms may be additionally movable with respect to the common actuating mechanism 25, 26 in order to obtain more convenient adjustment.

An electron-cyclotron with 60,000 volts and a direction unit value of 10,000 amperes per square centimeter and angular space in accordance with a monochromatic condition of $$\frac{\Delta E}{E} = 10^{-4}$$

required a constant field of about 170 Gauss and an operating wave length for four dees of thirty-five centimeters, the vacuum vessel having a diameter of about ten centimeters.

Fig. 3 shows a cyclotron according to this invention connected to an electron microscope.

The designation for the electronic-cyclotron is the same as in the preceding figures shown above. Two pairs of dees are used. The incandescent cathode 5 is partly surrounded by the electrode 8 with lower electrical potential than cathode 5 to achieve a bundling effect for the electrons emitted from the incandescent electrode in to the dees 3 at an angle computed to be most favourable. The grid 6 regulates the entry of the electrons, the slotted anode 7 imparts an initial velocity to the electrons. The deflecting condenser 12 causes the electrons to pass in the interior of the dees 3 from the last orbit into the tube 11 which ends in the electron-microscope. Electronic lens 27 forms an image of outlet opening in the plane of the specimen under examination. The latter is placed on object stage 28. The objective 29, the projector 30 and the fluorescent screen 31 may visually be observed with the light-microscope 32 are arranged in a usual manner for the visual observation of the latter.

Fig. 4 shows an example of a combination of an electron-cyclotron and an X-ray-tube of known construction. The glass vessel 1 for the electron-cyclotron is conected to the evacuated X-ray-tube 33 by the connecting tube 11. The electronic energy is transformed into X-rays and heat at the anode 34. The X-rays leave the vessel through the window 35.

Fig. 6 is a diagrammatic plan view of the electron cyclotron shown in Fig. 1 with the electric circuit elements shown in Fig. 5. The source of the electrons is shown symbolically by the electrode 8, also known as a Wehnelt cylinder. This figure illustrates more particularly the arrangement of the aforesaid sectors of ferromagnetic material. The example illustrated includes six sectors marked 40 and 42, alternately in two groups. The sectors in each group have the same magnetic value in regard to permeability and thickness. The sectors in the one group 40 differ from the sectors in the other group 42 with respect to their effect in varying the azimuthal field in the approximate proportion of 1:0.6.

What is claimed is:

1. An electron cyclotron comprising an evacuated casing forming a chamber, at least one pair of electrodes in said casing, a magnet on each side of the casing forming a magnetic field around said electrodes, electric circuit elements connecting said electrodes with a source of high frequency oscillating current, said circuit elements including an electron emission element and a condenser for deflecting the speeded up electrons at the outer edge of said magnetic field and means on each side of said electrodes between the latter and the said magnets for periodically varying the azimuthal field in the approximate proportion of 1:0.6, said means comprising adjustable sectors of ferromagnetic material.

2. An electron cyclotron according to claim 1 in which the said magnets have spherical surfaces adjacent the said casing to compel the lines of force of the magnetic field to follow a predetermined path along the radius of said field.

3. An electron cyclotron according to claim 1 in which the said magnets are adjustable movable toward and away from each other.

4. An electron cyclotron according to claim 1 including an adjustable magnetic shunt device interposed between and operatively connected to the said two magnets for regulating the magnetic field between the said two magnets.

5. An electron cyclotron for producing a continuous flow of electrons comprising an evacuated casing forming a chamber, at least one pair of electrodes in said chamber, a permanent magnet on each side of said casing forming a magnetic field around said electrodes, said magnets being of the same polarity and having spherical surfaces adjacent said casing to compel the lines of force of said magnetic field to follow a predetermined path along the radius of the magnetic field, electric circuit elements connecting said electrodes with a source of high frequency oscillating current, said circuit elements including an electron emission element and a condenser for deflecting the speeded up electrons at the outer edge of said magnetic field and means on each side of the said electrodes between the latter and said magnets for periodically varying the azimuthal field in the approximate proportion of 1:0.6, said means comprising adjustable sectors of ferromagnetic material arranged alternately in two groups, the sectors in one group having a higher permeability than the sectors in the other group and an adjustable magnetic shunt device operatively connected to the said two magnets for regulating the magnetic field between said magnets.

References Cited in the file of this patent

UNITED STATES PATENTS

| Number | Name | Date |
| --- | --- | --- |
| 1,417,912 | Hewitt | May 30, 1922 |
| 2,103,303 | Steenbeck | Dec. 28, 1937 |
| 2,159,478 | Gerhard | May 23, 1939 |
| 2,242,888 | Hollman | May 20, 1941 |
| 2,243,041 | McClintock | May 20, 1941 |
| 2,265,113 | Dick | Dec. 2, 1941 |
| 2,297,305 | Kerst | Sept. 29, 1942 |
| 2,555,456 | Prache | June 5, 1951 |
| 2,559,582 | Bailey | July 10, 1951 |
| 2,626,351 | Powell | Jan. 20, 1953 |